(12) United States Patent
Laurent et al.

(10) Patent No.: US 7,222,176 B1
(45) Date of Patent: May 22, 2007

(54) APPARATUS AND METHOD FOR USING STORAGE DOMAINS FOR CONTROLLING DATA IN STORAGE AREA NETWORKS

(75) Inventors: Thierry Laurent, Fort Lauderdale, FL (US); Ziya Aral, Pompano Beach, FL (US)

(73) Assignee: Datacore Software Corporation, Ft. Lauderdale, FL (US)

( * ) Notice: Subject to any disclaimer, the term of this patent is extended or adjusted under 35 U.S.C. 154(b) by 410 days.

(21) Appl. No.: 09/649,120

(22) Filed: Aug. 28, 2000

(51) Int. Cl.
*G06F 15/173* (2006.01)
*G06F 15/16* (2006.01)

(52) U.S. Cl. ................ 709/226; 709/225; 709/229

(58) Field of Classification Search ........... 709/225, 709/219, 223, 229, 226, 214, 215, 211; 711/5, 711/170, 171, 173; 707/9
See application file for complete search history.

(56) References Cited

U.S. PATENT DOCUMENTS

| | | | |
|---|---|---|---|
| 5,784,612 A * | 7/1998 | Crane et al. ............. 713/100 |
| 5,905,995 A * | 5/1999 | Tabuchi et al. ........... 711/114 |
| 6,073,209 A * | 6/2000 | Bergsten ................ 711/114 |
| 6,148,349 A * | 11/2000 | Chow et al. .............. 710/33 |
| 6,260,120 B1 * | 7/2001 | Blumenau et al. ......... 711/152 |
| 6,343,324 B1 * | 1/2002 | Hubis et al. ............. 709/229 |
| 6,400,730 B1 * | 6/2002 | Latif et al. .............. 370/466 |
| 6,502,162 B2 * | 12/2002 | Blumenau et al. ........... 711/5 |
| 6,516,350 B1 * | 2/2003 | Lumelsky et al. .......... 709/226 |
| 6,571,354 B1 * | 5/2003 | Parks et al. ............... 714/7 |
| 6,597,956 B1 * | 7/2003 | Aziz et al. ................ 700/3 |
| 6,598,174 B1 * | 7/2003 | Parks et al. ............... 714/6 |
| 6,606,690 B2 * | 8/2003 | Padovano ................ 711/148 |
| 6,622,163 B1 * | 9/2003 | Tawill et al. .............. 709/211 |
| 6,640,278 B1 * | 10/2003 | Nolan et al. ............... 711/6 |
| 6,742,034 B1 * | 5/2004 | Schubert et al. .......... 709/226 |
| 6,745,207 B2 * | 6/2004 | Reuter et al. ............. 707/200 |
| 6,779,016 B1 * | 8/2004 | Aziz et al. ............... 709/201 |
| 6,813,686 B1 * | 11/2004 | Black ................... 711/114 |
| 6,826,580 B2 * | 11/2004 | Harris et al. ............. 707/202 |
| 6,852,715 B1 * | 2/2005 | Garcia Gravalos et al. ..... 514/211.08 |
| 6,907,498 B2 * | 6/2005 | Kitamura et al. .......... 711/112 |
| 6,947,938 B2 * | 9/2005 | Ito et al. ................. 707/9 |
| 6,950,871 B1 * | 9/2005 | Honma et al. ............ 709/226 |
| 2002/0103889 A1 * | 8/2002 | Markson et al. ........... 709/223 |
| 2004/0073675 A1 * | 4/2004 | Honma et al. ............ 709/226 |
| 2004/0230787 A1 * | 11/2004 | Blumenau et al. .......... 713/1 |

* cited by examiner

*Primary Examiner*—Rupal Dharia
*Assistant Examiner*—Kristie Shingles
(74) *Attorney, Agent, or Firm*—Rader, Fishman & Grauer PLLC; Christopher M. Tobin (57) ABSTRACT

A Storage Domain architecture in which a pool of storage devices is controlled by one or a plurality of Storage Domain Servers (SDS) and create a single, compatible, enterprise wide, storage resource pool that appears to the system as a gigantic shared disk drive. These storage devices may be connected to the Storage Domain Server directly via SCSI enclosures attached to the server, across a private Fiber Channel (FC) network, and/or across a public SAN fabric via switches and hubs. The Storage Domain Server logically maps physical storage data on individual storage devices to logical storage data and presents to each host the storage resources allocated to that host by the storage administrator within the Storage Domain. Data stored in the system is available to all authorized hosts and protected against unauthorized access. Storage Domain Servers control all storage devices directly attached to them or scattered in the FC network, and present a consolidated view of that available storage to hosts. The storage resource pool is divisible into multiple and secured "virtual and logical data volumes" that match the requirements of individual hosts. The volumes are allocated to the appropriate host regardless of physical location and then granted a set of properties and rules through the Storage Domain. The Storage Domain allows the volume to be handled independent of the hardware, such that it uniformly supports all storage devices, such as optical discs, magnetic disks, arrays, storage controllers, etc. All volumes can be addressable as simple disc drives.

31 Claims, 4 Drawing Sheets

APPARATUS AND METHOD FOR USING STORAGE DOMAINS FOR CONTROLLING DATA IN STORAGE AREA NETWORKS

BACKGROUND OF THE INVENTION

1. Technical Field

The present invention relates to computer data storage systems. In particular, it relates to the organization and partitioning of data in Fiber Channel (FC) based storage area networks (SANs) into storage domains (SDs) that are controlled by Storage Domain Servers (SDSs) such that global control and access to data storage is provided by the SDS.

2. Background Art

The development of computers initially focused on local systems with attached dedicated storage devices. Over time, communication systems were developed to allow sharing of data between computers. However, these early systems were slow and often not capable of allowing widespread or complete access to data across the network. As the need for data sharing between systems increased, a more effective method of controlling access to data between systems was needed.

Today, computing systems face a crisis in data access, storage, protection and availability. Critical data is now found on all platforms spread throughout the enterprise. This information is often isolated, incompatible, and too slow to respond to the emerging needs of the enterprise. However, while the storage and retrieval of common data by the entire enterprise is now a requirement, much of that data currently resides on incompatible, disparate, and isolated storage systems organized as localized "islands of information." As a result, while the need to access data is global throughout the enterprise, control of that data is local. It would be desirable to have a system that could provide global control of data throughout the enterprise.

Isolated islands of storage were acceptable as long as enterprise applications were also isolated to a given locality or operating system cluster and amongst a small number of server platforms. With the advent of large-scale networking, enterprise applications have proliferated onto a myriad of interconnected computer systems. The combination of networked servers and private storage has guaranteed that data is allocated, replicated, and managed in an ad-hoc manner. Today the limitations of storage technology determine the manner in which data is organized and presented. It would be desirable to be able to manage data on a large-scale, across interconnected computer systems, in such a manner that data availability could be controlled in a uniform and comprehensive manner and not limited by the particular storage technology being used.

Until recently, data storage devices have required close coupling to computing systems. High bandwidth access was achieved through distance limited connections in point-to-point configurations. Early mass storage control techniques recognized these physical limitations and concentrated storage in large locally attached storage controllers. These controllers provided high levels of connectivity combined with large storage capacity. To achieve high levels of performance these early controllers were also proprietary, expensive, and complex in design.

The networking of these storage controllers was impractical due to the limitations in bandwidth of early network technologies. These technologies could not eliminate the problem of "islands of information." In part, this was due to the fact that the logical allocation of storage resources between these controllers was impossible.

One step in the solution to the problem of providing adequate access to data has been the development of high-speed Fiber Channel (hereinafter "FC") connections. It should be noted that, for the purpose of this discussion, the term "fiber" in fiber channel can be used to denote either an optical or an electrical (i.e. copper wire) connection. FC connections provide computer systems with extremely high-speed data transfer rates. For example, they can deliver sustained bandwidth's of over 97 MB per second. In addition, due to their relatively low cost of implementation, cost per megabyte of data transfer is low.

Another advantage of FC technology is that, unlike other data transfer mechanisms such as ethernet, FC technology is protocol independent. It can be used for transferring audio/video, TCP/IP, Internet Protocol (IP), SCSI data, etc. FC technology also provides advantages over prior technologies due to the large distances which can be supported without serious degradation of performance or reliability. For example, FC systems can support devices as far away as ten kilometers. As a result, as computing networks control and support ever larger data volumes, data transfer rates, and total numbers of users, FC architecture has emerged as important element in the solution to the problems related to managing data in those large-scale networks.

Another element of the solution to storage management problems has been the development of storage area network ("SAN") products. A SAN is a connection scheme between computers and storage peripherals which is based on an FC data transport mechanism. SANs typically use FC technology as the data transport means between multiple systems and networks due to their excellent performance and reliability.

A Storage Area Network ("SAN") can be defined as an architecture composed of a group of storage systems and servers that are connected together via Fiber Channel (FC) equipment, such as a switch or hub. The introduction of SANs provides some partial solutions to a number of problems related to the "islands of information" in global storage systems. These solutions are limited to high bandwidth, increased connectivity, and robust topologies using FC hubs and switches. However, SANs address only two of the emerging enterprise storage requirements: improved connectivity and higher bandwidth. The resultant storage systems themselves remain proprietary and non-interoperable. The other requirements, such as interoperability, storage resource allocation and management, and high performance, have not been addressed with today's SAN architectures.

Despite their promise, SANs today are largely confined to two areas: 1) as extended server host and device connection methods for proprietary storage controllers; (i.e. as the backbones for vendor "private" networks); and 2) as storage networks specific to applications, typically those in which direct access to physical disks (1 to 1 mapping) is required and storage administration is limited or nonexistent. Other critical requirements, such as storage resource allocation and management, security, administration, and interoperability have not been addressed with today's SAN architectures.

SANs therefore have two major limitations. First while they may provide extended host and device interconnection for proprietary storage controllers on private networks, the resulting storage systems are isolated and not interoperable within the enterprise as a whole. Second, storage networks are tied to specific applications and provide only one-to-one mapping. For example, in Windows/NT™ systems, NT will seek out and attempt to control all drives within the network even if those drives are required to be logically separated. Within UNIX, each OS will attempt to logically map all attached devices. Therefore, in UNIX, there is no centralized management and security structure which is aware of the overall storage management structure of a distributed system. SANs therefore increase the exposure of data storage systems to corruption because they lack a network oriented logical to physical mapping facility for disk drives, controllers, and operating systems. SANs allow a large number of devices to be attached to a system; however the visibility of these devices to the system is insufficient to "virtualize" the physical devices into logical pools of integrated and secure storage. It would be desirable to improve upon SANs with a system that bridges the logical mapping requirements of operating system file services, physical devices, and the SAN interconnection to provide universal data resource control and availability in conjunction with the performance and conductivity advantages of SANs.

While addressing the basic desirability of using SANs to provide wide scale access to data, the prior art has failed to provide a uniform and secure method of using SANs which also provides universal access and logical mapping of data across large-scale computing environments independent of the storage platforms used in the system.

SUMMARY OF THE INVENTION

The present invention solves the foregoing problems by providing a Storage Domain architecture in which a pool of storage devices is controlled by one or a plurality of Storage Domain Servers (SDS). These storage devices may be connected to the Storage Domain Server directly via SCSI enclosures attached to the server, across a private Fiber Channel (FC) network, and/or across a public SAN fabric via switches and hubs. The Storage Domain Server logically maps physical storage data on individual storage devices to logical storage data and presents to each host the storage resources allocated to that host by the storage administrator within the Storage Domain.

DESCRIPTION OF THE PREFERRED EMBODIMENT

For ease of discussion, the following definitions of terms will be used when describing the invention: a) "Host" shall mean any standalone computer, application server, enterprise server or workgroup computer for which the Storage domain Server is allocating logical devices from the storage resource pool; b) "Storage Resource Pool" shall mean one or more, possibly heterogeneous, physical storage device(s) from which logical volumes are being allocated by Storage Domain Servers and presented to one or many Host(s); c) "System" shall mean one or more Storage Domain Server(s), one or more Storage Domain(s) and a storage resource pool; d) "SAN Region" shall mean one or more Storage Domain Server(s) logically grouped together to limit the scope of Storage Domains' capabilities and provide a logical view of the SAN topology; and e) "Record" shall mean a vector of information containing static or dynamic configuration data used to configure and control the Storage Domain Server.

Prior to a detailed discussion of the figures, a general overview of the features and advantages of the invention will be presented then a detailed presentation including in-depth technical information will be presented.

OVERVIEW OF THE PREFERRED EMBODIMENT

Storage Domains solve problems inherent in conventional SAN systems such as security, resource allocation, resource management, resource planning, performance monitoring and quality of service. In addition, the Storage Domain architecture integrates a development platform enabling features such as High Availability (HA), centralized management, application server clustering, point-in-time copy and backups to be developed.

The expansion of business applications to all platforms and all localities has resulted in the need for global information storage, access, and retrieval systems. With the introduction of FC networks has appeared the need to be able to manage all physically attached and heterogeneous resources on that network. FC networks provide the physical means of carrying and routing FC traffic through a network of FC switches and/or Hubs. The solution to managing FC storage resources scattered throughout a FC network resides in the adoption of Storage Domain Servers (SDS) and, in addition, a virtual partitioning of the SAN into Storage Domains.

By adding Storage Domain Servers to the FC network we have now created a Storage Area Network (SAN) based on Storage Domains; an intelligent, cooperative and scalable technology aimed at solving the crisis of storage. Storage Domain Servers are backbone components to build a SAN architecture through Storage Domains. In place of multiple, incompatible, local storage devices, Storage Domains provided by the invention create a single, compatible, enterprise wide, storage resource pool. In effect, the storage resource pool would appear in the system to be a gigantic shared disk drive.

Managed through Storage Domains, the resultant storage resource pool benefits from the following advantages:

a. Data stored in the system are available to all authorized hosts and protected against unauthorized access.

A conventional FC Network has the ability to interconnect various storage devices to hosts. However such a solution lacks a unified underlying method to present and share resources presented by those storage devices. FC equipment vendors offer features like zoning in order to enforce hard-policies aimed at restricting access from a host to a certain set of FC storage devices but such configurations are difficult to implement and maintain, as well as offer a coarse granularity of FC resource sharing. A partitioning of the FC Network using zoning leads to very rigid networks topology where the logic is embedded in the FC hardware equipment with little or no compatibility among switch vendors. This partitioning can become extremely complicated to manage and enhance when geographically dispersed FC networks must be consolidated. Moreover, if the distance between two SAN sites is such that other interconnection protocols must be used to carry the FC traffic the complexity is enhanced by the fact that heterogeneous levels of security must be put in place to guarantee data integrity and security. As a consequence, it becomes extremely difficult for an administrator to plan and grow its SAN. Even if humanly possible with the help of network planning tools, the associated cost of having to zone remote sites would be prohibitive.

Storage Domain Servers take control of all storage devices directly attached to them or scattered in the FC network, and present a consolidated view of that available storage to hosts. By doing so, Storage Domain Servers are also able to enforce soft-policies that can be easily established and modified, at any given time, through an intuitive interface based on drag-and-drop. The result is an optimized distribution of the storage resource pool available among heterogeneous hosts.

b. The storage resource pool is divisible into multiple and secured "virtual and logical data volumes" (hereinafter "Volumes") that match the requirements of individual hosts. This allows a resulting volume to be allocated to the appropriate host regardless of its physical location and then be granted a set of properties and rules through the Storage Domain. The Storage Domain allows the volume to be handled independent of the hardware, such that it uniformly supports all storage devices including optical discs, magnetic disks, arrays, storage controllers, etc. The system is entirely compatible with existing enterprise corporate hosts since all volumes can be addressable as simple disc drives.

By organizing access to the data through logical volumes, hosts can access the data without regard to the physical device technology, or connection schemes. In addition, the use of FC technology to transfer data between Storage Domain Servers allows hosts to access the volume without regard to the physical location of the storage device. The FC data transfer also provides high performance levels for input-output operations without limitation due to distance.

c. Storage Domains allow properties, capabilities, features and services to be available and configurable by taking into account the ultimate end-to-end path taken by I/Os. That guarantees a consistent and global control of the I/O path independently of the hardware equipment involved in carrying the I/O protocol across the network. A Virtual Path (VP) is created between the host for which the volume is provided on one end and the volume under control of the Storage Domain Server on the other end. Each Virtual Path is identified by a unique Id.

d. In addition to providing hardware independence, the storage domains allow data to be used across multiple platforms. For example, Windows/NT and Unix based platforms can share data. Further, the storage domains overcome the drawbacks associated with SANs by managing, allocating, and reallocating data from a single centralized point. This eliminates the "islands of information" problem which remains in systems that use SANs without the benefits provided by storage domains. Central control of data with storage domains also allows the data storage to be scalable from a few users and platforms to a multitude of users and platforms. The centralized control also improves data integrity levels comparable or beyond current RAID technologies.

Another major advantage is that no addition to the host's operating system is necessary to grant a host access to a volume; Access control and management of all volumes in the storage resource pool is performed from any Storage Domain Server where only the storage administrator has privilege to alter the properties of a Virtual Path and capabilities of the Storage Domain. This concept guarantees the highest level of security required by storage systems since no tampering of access controls from a host itself is possible.

Storage Domains solve problems inherent in conventional SAN systems such as security, resource allocation, resource management, resource planning, performance monitoring and quality of service. These issues and others can be resolved by the introduction of the Storage Domain Server at the core of the system. The Storage Domain Server provides for bridging the physical SAN to the file services layer of the host's operating system and its applications.

The storage resource pool is composed of storage devices controlled by one or a multitude of Storage Domain Servers. These devices may be connected to the Storage Domain Server directly via SCSI enclosures attached to the server, across a private FC network, and/or across a public SAN fabric via switches and hubs. These devices may be simple disks, RAID adapters, storage arrays, storage controllers, or any subset or combination of the above. Regardless of the physical location of the storage devices, the Storage Domain Server presents to each host the data volume allocated to that host by the storage administrator within the Storage Domain.

The Storage Domain Server role is to directly control physical devices and provide the means to map the controlled physical storage to a virtualized logical storage (also called a volume) in order to meet individual hosts needs and privileges. The resulting logical volume is presented to individual hosts or a multitude of hosts, thus relieving hosts from the burden of managing the actual physical storage device.

The logical storage presented to a host may be assembled from a one-to-one combination of physical storage device and/or a one-to-many combination of, possibly heterogeneous, physical storage devices.

The versatility of Storage Domains allows any host to be connected to any volume across the FC network, thus creating a Virtual Path, but still be controlled by a common set of capabilities configured in each Storage Domain. In addition, each Virtual Path is configured with intrinsic properties that cannot be shared with other VPs nor inherited by the Storage Domain. This concept demonstrates the fundamental difference between properties and capabilities, and the different levels at which they operate.

Storage Domains do not define nor restrict the way a particular storage device is being managed in the storage resource pool. Capabilities are softly configured for the Storage Domain and broadcasted to all Storage Domain Servers involved in managing Virtual Paths defined in the Storage Domain.

Storage Domains are all defined within a Region. The concept of Region exists to further enhance the virtualization of the SAN and logically groups together one or many Storage Domain Server(s). The Region has neither geographical boundary nor limitation and achieves the total virtualization of a SAN portion into a logical view from which Storage Domains can be created. All Storage Domain Servers defined in the same Region are able to exchange static and dynamic configuration parameters and events.

The goal of the Region is to logically isolate a portion of the SAN; therefore Regions cannot be conjoint to one another. However they can be merged when an association is needed between foreign Virtual Paths, for example, when a Storage Domain A present in Region A is being scaled to encompass virtual paths present in Region B but whose capabilities must now follow the ones of Storage Domain A.

DETAILS OF THE PREFERRED EMBODIMENT

In this section we will describe in greater details the invention by adding technical information aimed at building the solution described by the invention.

The Virtual Path discussed in the overview section of the preferred embodiment is the Storage Domain's most atomic element. A Storage Domain contains one or many VPs that are grouped together according to the storage administrator's goals, often dictated by the enterprise organization. A Virtual Path is created when an association is made between a host and a volume. This association grants the host access to that volume according to configured access control parameters and describes the end-to-end path taken by I/O operations from/to the host and the Storage Domain Server. Practically, the association can be realized using any interface showing the virtualized data volume from the storage resource pool under control of a specific Storage Domain Server and the host. Those skilled in the art will recognize that a Graphical User Interface (GUI) will reveal how intuitive this association can be; however the interface can be implemented through any other mean available on the software platform.

The resulting VP is uniquely identified by the combination of the following elements:

a. The host's FC unique identifier, formed by the FC HBA's vendor World Wide Name (WWN). This is the adapter by which I/O operations are performed on the host.

b. A multiplexing endpoint identifier, formed by the Logical Unit Number (LUN).

c. The Storage Domain Server's unique identifier, formed by a globally registered WWN. When the Storage Domain Server is enabled it is setup with a unique WWN that cannot be repeated among other Storage Domain Servers participating in the same Region.

d. The Storage Domain Server's FC unique identifier, formed by the FC HBA's vendor World Wide Name (WWN). This is the adapter by which I/Os are performed on the SDS.

e. The volume's unique identifier, formed by the Volume ID.

During its creation the Virtual Path is associated to a Storage Domain. If the Storage Domain already has capabilities set up then the new VP will be enabled in compliance with those capabilities. If no capabilities are set yet then default values should be applied with respect to not contradict those that the storage administrator has enforced for other Storage Domains.

Within a Storage Domain, I/O operations are validated on a per I/O basis for the VP. The validation process ensures that proper access controls are configured for processing by layers fetching the secured volume data. Each I/O is trapped, checked for access control and analyzed by a capability layer whose role is to account and report statistical information about the VP carrying this I/O. All Virtual Paths' statistical information is gathered and redistributed through new runtime parameters to the Storage Domain in which the VP is defined.

The capability layer should be as streamlined as possible since it is placed in the critical data delivery path. Therefore, the preferred implementation is to have a background processing fetching those statistical data for analysis and let the capability layer be a slave component basing its decision process on runtime parameters set up and refreshed externally from its own logic. The second great benefit is to not have to interlock with other components in the SDS while accessing those decision-making parameters as they are browsed but never modified by the layer. Those skilled in the art will recognize that other programming options are selectable depending on the software platform used for implementing Storage Domains.

A Region is created or grown by registering in a Storage Domain Server. A Region name is provided for that effect when the SDS is configured during its installation phase. The Storage Domain Server initially triggers an auto-discovery process during the final step of its startup phase. After having successfully retrieved the current Region configuration it registers itself in, listing its available volumes and accepting configuration records from a configuration tool. The discovery, registration process and format of the structure hosting the Region parameters are not in the scope of this invention and will not be discussed further. We turn now to a detailed discussion of the figures.

Figure 1:
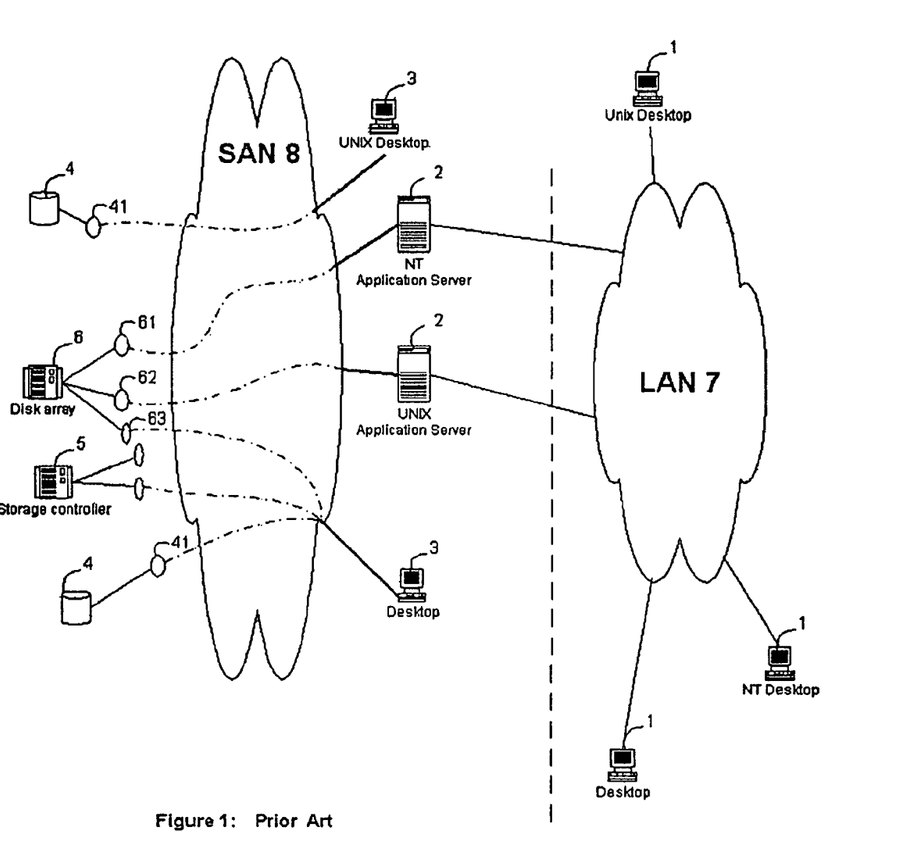
FIG. 1 is a prior art SAN in which a plurality of hosts are attached on a Storage Area Network or on a Local Area Network, and access their storage devices through the SAN.

Referring to FIG. 1, this figure illustrates a prior art SAN technology in which a variety of hosts, such as servers 2 and desktops 3, are directly connected on SAN 8. In addition, remote hosts such as desktops 1, may be attached to LAN 7. In this embodiment, each host 2 attached to SAN 8 would be able to access the storage devices 4, 5 and 6 attached to SAN 8. Likewise, remote hosts 1 would be able to access their data on SAN 8 through hosts 2 that are directly attached to both SAN 8 and LAN 7. In a typical environment, hosts 2 would be computers using popular operating systems such as Windows/NT or variations of the Unix operating systems. However, those skilled in the art will recognize that SAN technology can be used in conjunction with any suitable software platform such as those capable of running on personal computers through mainframe computers systems.

Each host 2 attached to SAN 8 would have to be able to recognize and be configured to communicate with a particular type of storage device represented by devices 4, 5 and 6. Since not all of hosts 2 will be capable of or be configured to access all of the devices 4–6, the organization as a whole will still have the traditional problem of islands of information that are not accessible by all users in the organization.

Each storage devices' addressable logical unit is not shareable among hosts 2–3. Since storage devices 4 contain a unique addressable logical unit 41, it is impossible for hosts 3 to surrender a portion of their possibly unused unit 41's storage space for hosts 2 to use, whereby wasting a great amount of storage space.

Even though hosts 2 are configured to access units 61 and 62 and host 3 unit 63, host 3 will be able to discover units 61 and 62 as well and will have to be configured not to use units 61 and 62, whereby creating a security hole as hosts 2 and 3 could be owned by different groups in the organization. The only solution left to the administrator here would be to dedicate access to the entire device 5 for hosts 2 through hardware zoning, whereby wasting storage space and turning SAN 8 to a very rigid topology causing administration trouble at each step of the organization's growth.

Value-added storage system's features can only be implemented on hosts 2–3 and necessitate the addition of specific software on all hosts. Such software might not exist for all software platforms implemented by hosts 2–3. Further, storage features are being mixed with specific hosts' applications, thus rendering the whole host platform unstable and prone to failure.

Figure 2:
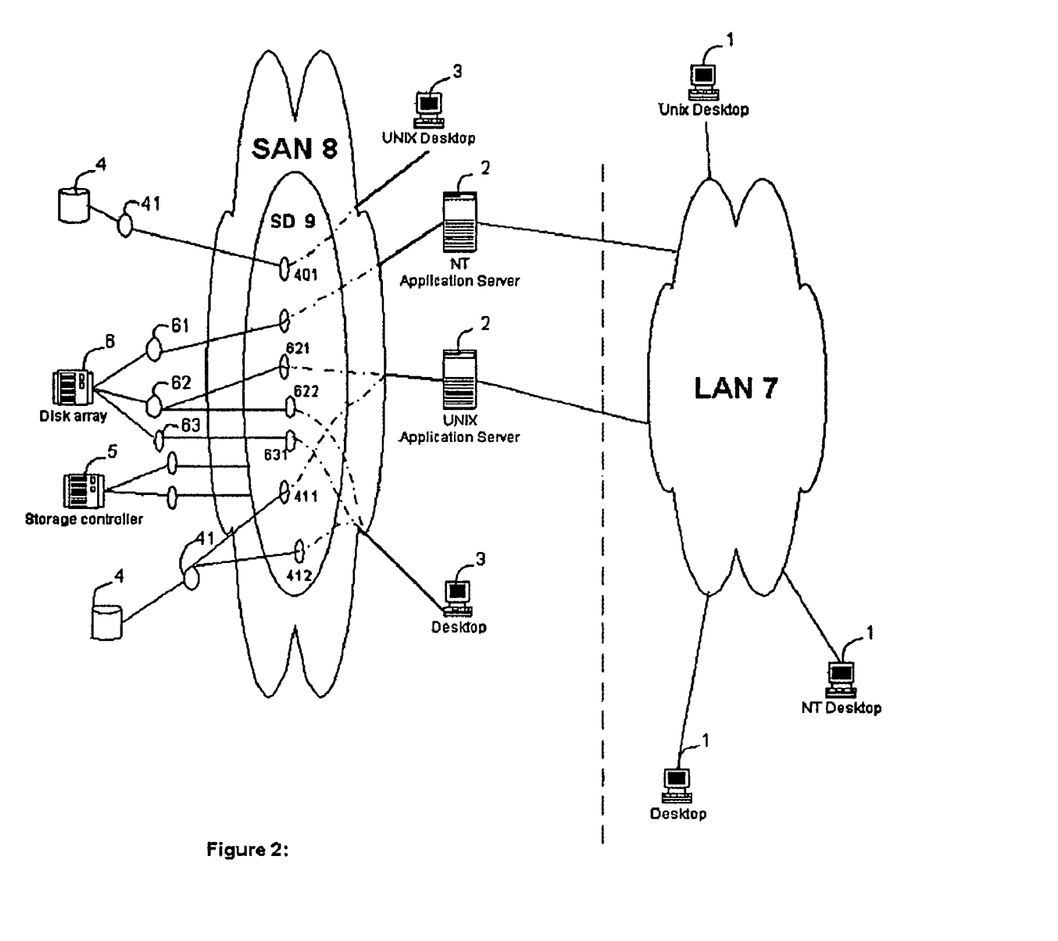
FIG. 2 is an illustration of a preferred embodiment of the invention that uses Storage Domains and Storage Domain Servers in conjunction with the SAN.

FIG. 2 illustrates a SAN technology that implements the Storage Domains of the invention shown. In this figure the Storage Domain, SD 9, is composed of one or many Storage Domain Server(s). For ease of illustration and readability, the SD 9 software has been illustrated abstracted from Storage Domain Servers. However, in the preferred embodiment, the SD 9 software would reside in the Storage Domain Servers.

Also, for ease of discussion, hosts 2 acting as stealth application servers have not been chosen to also host the Storage Domain software, but those skilled in the art will recognize that any system capable of communicating with the SAN network can implement the storage domain, including personal computers, servers, minicomputers, mainframe computers, and supercomputers. In addition, any combination of the aforementioned list of computers can be implemented as a single storage domain network. Due to this, SD 9 allows the integration of disparate and otherwise incompatible systems into a single network where data is available to all users regardless of the particular hardware or software platform a particular user has.

For ease of understanding the figure depicts only one Storage Domain SD 9 where all Virtual Paths inherit the same capabilities. However, the same logic applies to a multitude of Storage Domains as developed in FIG. 3.

SD 9 is configured to access and control all storage devices 4–6, which includes all their addressable logical units, whereby creating a global storage resource pool from a multitude of heterogeneous storage devices. The SD 9 software logic then creates one or more volume(s) from each logical unit it controls. Logical unit 62 can now be partitioned into 2 volumes, 621 and 622, and then accommodate the distribution of unused storage space to heterogeneous hosts 2 and 3. The logical unit becomes now shareable among hosts 2–3 and the granularity of storage allocation can be refined to just allocate what the host needs.

Every volume so created becomes now an addressable unit that hosts 2–3 will be capable to access because of the virtualization performed by SD 9. Moreover this virtualization also alleviates the need for hosts 2–3 to be aware of the physical characteristics of the storage device as the SD 9 software logic handles all translations required by hosts' operating systems to access a particular device type. Even though volumes 401 and 622 are created from two drastically different storage devices, the protocol to access those volumes from hosts 2 and 3 will be automatically adapted by SD 9 depending on specific aspects of each host's operating system, transparently for the host and without any specific configuration on the host itself and limited, if any, on SD 9. In this manner, the various hosts in the system no longer need to be concerned about physical characteristics of the storage device because they never directly access the storage device.

All I/O requests from hosts 2–3 are funneled through SD 9. The SD 9 software configures and controls access to all data stored on devices 4–6 through the configured volume. When a request for data is received from a host, the request is internally directed to a volume image and not directed to the actual physical I/O device. The great advantage is the ability to process I/O requests from an internal high performance and adaptive cache within SD 9, whereby dramatically reducing high latency physical devices' I/O requests.

Because each volume's properties are configured from SD 9 and I/O requests are validated from SD 9, this centralized control and management ensures that data is always protected from unauthorized access. No host configuration can grant access to a volume within SD 9; only SD 9 configuration tools, under unique control of the storage administrator, can realize that function. It also means that each host is automatically restricted to discover only those volumes that have been configured for its use. Contrary to FIG. 1, there is no longer a need to modify the SAN topology or use hardware zoning in order to prevent an unauthorized host from discovering a volume.

The SD 9 software presents a front-end interface to hosts 2–3 by which it processes their I/O requests. Using a back-end interface the SD 9 software controls all storage devices. The advantage is that future unknown storage devices could be abstracted and virtualized as already known storage device types, whereby accelerating the adoption and integration of new storage devices.

Figure 3:
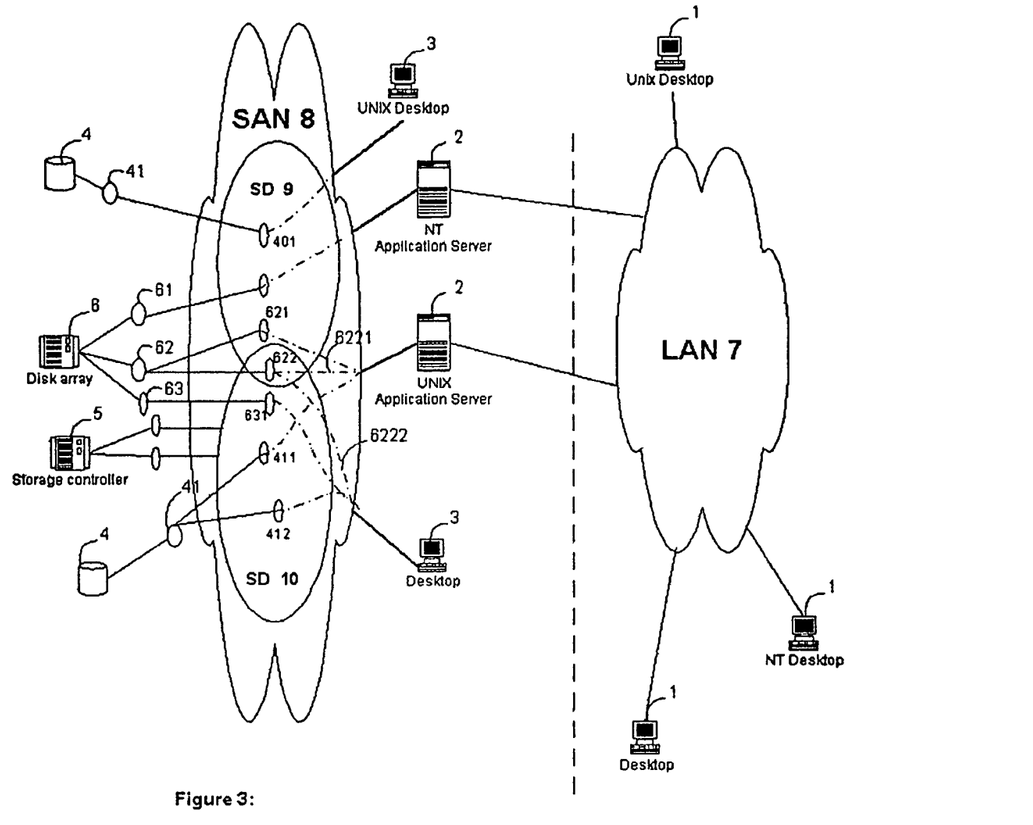
FIG. 3 is an alternative preferred embodiment which uses multiple storage domains.

In FIG. 3, an alternative preferred embodiment is shown which extends the embodiment of FIG. 2. In this embodiment, SD 10 has been added to SD 9 and illustrates capabilities that can be shared by a group of Virtual Paths within a Storage Domain. New Storage Domains can be defined gradually as the organization grows to adequately reflect the need to monitor accesses of different groups of users. For ease of illustration and readability, the SD 9 and SD 10 software has been illustrated abstracted from Storage Domain Servers. However, in the preferred embodiment, the SD 9–10 software would reside in the Storage Domain Servers. Because Storage Domains SD 9–10 are a logical grouping of Virtual Paths, their respective logic is present in all Storage Domain Servers. It is automatically enabled for all Virtual Paths channeled through one or many Storage Domain Server(s).

At the conjunction of SD 9 and SD 10 is volume 622 whose VPs are present in both Storage Domains. In SD 9 we find VP 6221 between volume 622 and host 2, and in SD 10 we find VP 6222 between the same volume 622 and host 3. Each VP can have a different set of properties and because they are in 2 different Storage Domains they can now have a different set of capabilities. VP 6221 can have properties set for host 2 to have full access to volume 622 whereas VP 6222 will be set for host 3 to have restricted access to volume 622. Because they are placed in different Storage Domains, VP 6221 could benefit from SD 9's capabilities to have higher privileges regarding the quality of service it gets from the SAN whereas SD 10 could be set with an acceptable quality of service. The great advantage is the ability to setup different classes of services regarding the same volume accessed by different hosts.

The SD 9 logic can span multiple Storage Domain Servers for example if different Storage Domain Servers control VPs to volumes 401, 621 and 622. This is a great advantage for scalability and continued high level of performance within the Storage Domain since more Storage Domain Servers can be gradually added to spread the workload of controlling the volumes and the Storage Domain extended accordingly. The advantage is that Storage Domains are not dependant on the Storage Domain Servers' physical configuration.

Each I/O request being funneled through volume 401 is analyzed by the Storage Domain's logic and valuable information extracted to account for this I/O request in SD 9. The SD 9 logic performs a cyclic post-processing of all VPs' information so gathered by all Storage Domain Servers controlling SD 9's Virtual Paths. According to capabilities configured for SD 9 a consensus is established that can modify the way I/O requests are processed by the SD 9 software. New operating parameters are then broadcasted to all Storage Domain Servers controlling SD 9's Virtual Paths.

Figure 4:
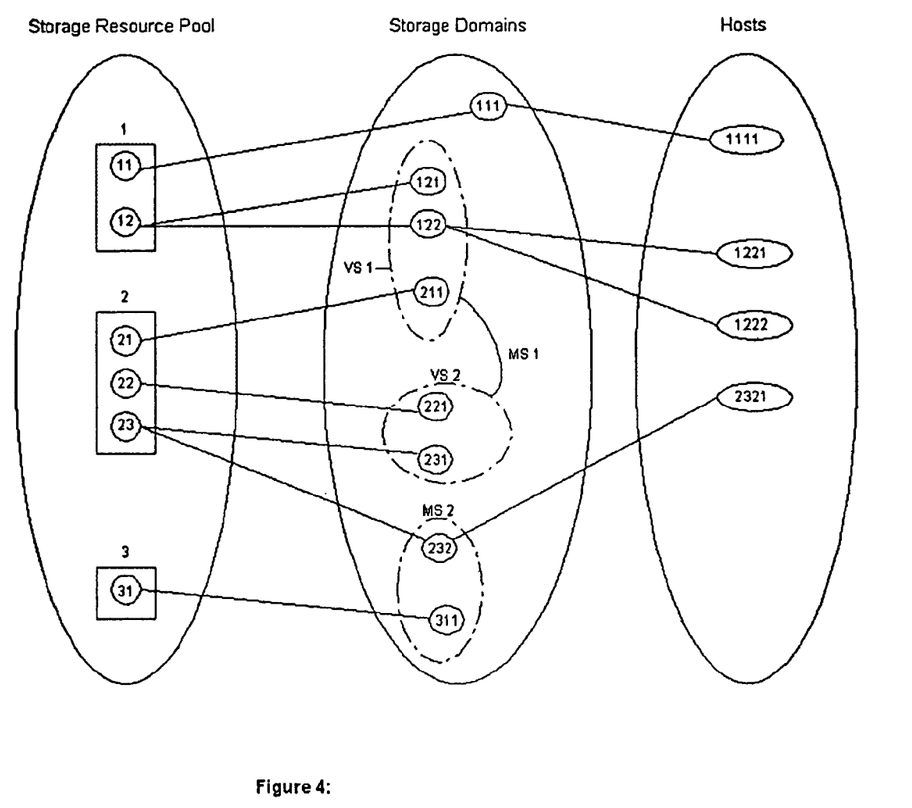
FIG. 4 is a preferred embodiment that illustrates the manner of accessing the storage resource pool using storage domains.

FIG. 4 shows a diagram view of the SAN that implements the Storage Domains of the invention. For ease of illustration and readability, no specific Storage Domain has been named. However, in the preferred embodiment, there would be one or many Storage Domains such to provide adequate capabilities to Virtual Paths. In the same manner, Storage Domain Servers do not appear in the diagrams; however, it is important to specify that volumes or volume sets requiring high availability by any mean should be paired with other volumes controlled by a different Storage Domain Server. Those skilled in the art will recognize that high availability can only be obtained through the use of more than one Storage Domain Server.

The drawing shows a diagram containing a global storage resource pool comprised of storage devices 1, 2 and 3. Each device is of a different type. Device 1 presents two addressable logical units 11 and 12; device 2 presents three units 21, 22 and 23 and device 3 presents only one unit 31. The Storage Domain software through one or many Storage Domain Servers controls all those logical units and has created volumes from them to accommodate their use.

Logical unit 12 is being split into two virtual volumes 121 and 122. The Storage Domain has made a volume set VS 1 comprised of those two volumes and volume 211. Volume 122 has been configured to be the access point for hosts in VS 1. Two VPs, 1221 and 1222, are used by Hosts to communicate with volume 122 to then access data in the volume set VS 1. Hosts will need software outside the scope of this invention in order to synchronize their access to VS 1 and not cause data integrity problems. Those skilled in the art will recognize that this is a known issue and that a wide variety of software is already available to realize that function. A different Storage Domain Server or the same SDS could control each volume from VS 1; that's because Storage Domains span transparently across Storage Domain Servers.

VS 1 is expandable through Storage Domains to accommodate the growing needs of Hosts. It is possible to increase the number of volumes part of VS 1 without having to intervene on the Host using VP 1221 and 1222. VS 1 can be presented to hosts 2–3 in the form of a giant disk drive where actual storage devices can be of different types.

A mirror MS 1 has been created between VS 1 and VS 2 by the Storage Domain software to provide a higher availability to VS 1. Those skilled in the art will recognize that mirroring is a high availability feature. Therefore, different Storage Domain Servers must host VS 1 and VS 2's volumes. Volumes 221 and 231 are not available to be assigned to hosts because they become internally reserved to realize MS 1. The advantage of Storage Domains is the ability to create high availability configurations without involvement from hosts 2–3. Moreover, hosts 2–3 are not aware of the fact that their Virtual Paths 1221 and 1222 are, or became, highly available, which makes it possible to dynamically change their properties by interrupting neither the hosts nor the Storage Domain software.

In the same manner as above, a mirror MS 2 is established between two single volumes. It is important to note that the flexibility of virtual volumes allows the same logical unit 23 to be part of two different high availability configurations.

While the invention has been described with respect to a preferred embodiment thereof, it will be understood by those skilled in the art that various changes in detail may be made therein without departing from the spirit, scope, and teaching of the invention. For example, the fiber channels used by the storage area networks can be replaced with any data transfer technology capable of sustaining the required bandwidth for a given application, the storage domain may be implemented in software, firmware, etc. Accordingly, the invention herein disclosed is to be limited only as specified in the following claims.

We claim:

1. A method for managing a storage area network (SAN), the method comprising:
    defining storage domains respectively having associated configurable storage management properties that are separate from individual physical capabilities of physical storage resources available through the SAN, wherein a first set of storage management properties is associated with a first storage domain and a second set of storage management properties is associated with a second storage domain, with the first set of storage management properties being different from the second set of storage management properties;
    accommodating the creation of logical volumes configurable for presentation to hosts through the SAN; and
    allocating the logical volumes to hosts in the context of the storage domains, wherein allocating a first logical volume to a first host in the context of the first storage domain entails the provision of storage resources according to the first set of storage management properties and allocating a second volume to a second host in the context of the second storage domain entails the provision of storage resources according to the second set of storage management properties
    wherein presentation of logical volumes to hosts accommodates storage resource access by hosts without requiring hosts to be configured according to the requirements of the physical storage resources, and wherein said allocation of the first logical volume to the first host entails the provision of storage resources according to the first set of storage management properties and said allocation of the second logical volume to the second host subject entails the provision of storage resources according to the second set of storage management properties even though the first logical volume and second logical volume are created from physical storage resources in common.

2. The method of claim 1, wherein the storage management properties comprise a guaranteed storage capacity.

3. The method of claim 1, wherein the storage management properties comprise a guaranteed I/O properties that include an I/O bandwidth and/or an I/O operations.

4. The method of claim 1, wherein the storage management properties comprise a guaranteed availability.

5. The method of claim 1, wherein the storage management properties comprise a guaranteed performance.

6. The method of claim 1, wherein the storage management properties comprise a guaranteed integrity.

7. The method of claim 1, wherein the first set of storage management properties includes a first class of service and the second set of storage management properties includes a second class of service, whereby access of the first and second volumes by the first and second hosts entails differing classes of service.

8. The method of claim 1, wherein the first and second sets of storage management properties are softly-configured such that they are reconfigurable without requiring an update of the connections to the physical storage resources.

9. A computer program product for managing a storage area network (SAN), the computer program product stored on a computer readable medium and adapted to perform operations comprising:
    defining storage domains respectively having associated configurable storage management properties that are separate from individual physical capabilities of physical storage resources available through the SAN, wherein a first set of storage management properties is associated with a first storage domain and a second set of storage management properties is associated with a second storage domain, with the first set of storage management properties being different from the second set of storage management properties;

accommodating the creation of logical volumes configurable for presentation to hosts through the SAN; and allocating the logical volumes to hosts in the context of the storage domains, wherein allocating a first logical volume to a first host in the context of the first storage domain entails the provision of storage resources according to the first set of storage management properties and allocating a second volume to a second host in the context of the second storage domain entails the provision of storage resources according to the second set of storage management properties, wherein presentation of logical volumes to hosts accommodates storage resource access by hosts without requiring hosts to be configured according to the requirements of the physical storage resources, and wherein said allocation of the first logical volume to the first host entails the provision of storage resources according to the first set of storage management properties and said allocation of the second logical volume to the second host subject entails the provision of storage resources according to the second set of storage management properties even though the first logical volume and second logical volume are created from physical storage resources in common.

10. The computer program product of claim 9, wherein the storage management properties comprise a guaranteed storage capacity.

11. The computer program product of claim 9, wherein the storage management properties comprise a guaranteed I/O properties that include an I/O bandwidth and/or an I/O operations.

12. The computer program product of claim 9, wherein the storage management properties comprise a guaranteed availability.

13. The computer program product of claim 9, wherein the storage management properties comprise a guaranteed performance.

14. The computer program product of claim 9, wherein the storage management properties comprise a guaranteed integrity.

15. The computer program product of claim 9, wherein the first set of storage management properties includes a first class of service and the second set of storage management properties includes a second class of service, whereby access of the first and second volumes by the first and second hosts entails differing classes of service.

16. The computer program product of claim 9, wherein the first and second sets of storage management properties are softly configured such that they are reconfigurable without requiring an update of the connections to the physical storage resources.

17. An apparatus for managing a storage area network (SAN), the apparatus comprising:

means for defining storage domains respectively having associated configurable storage management properties that are separate from individual physical capabilities of physical storage resources available through the SAN, wherein a first set of storage management properties is associated with a first storage domain and a second set of storage management properties is associated with a second storage domain, with the first set of storage management properties being different from the second set of storage management properties;

means for accommodating the creation of logical volumes configurable for presentation to hosts through the SAN; and means for allocating the logical volumes to hosts in the context of the storage domains, wherein allocating a first logical volume to a first host in the context of the first storage domain entails the provision of storage resources according to the first set of storage management properties and allocating a second volume to a second host in the context of the second storage domain entails the provision of storage resources according to the second set of storage management properties wherein presentation of logical volumes to hosts accommodates storage resource access by hosts without requiring hosts to be configured according to the requirements of the physical storage resources, and wherein said allocation of the first logical volume to the first host entails the provision of storage resources according to the first set of storage management properties and said allocation of the second logical volume to the second host subject entails the provision of storage resources according to the second set of storage management properties even though the first logical volume and second logical volume are created from physical storage resources in common.

18. The apparatus of claim 17, wherein the storage management properties comprise a guaranteed storage capacity.

19. The apparatus of claim 17, wherein the storage management properties comprise a guaranteed I/O properties that include an I/O bandwidth and/or an I/O operations.

20. The apparatus of claim 17, wherein the storage management properties comprise a guaranteed availability.

21. The apparatus of claim 17, wherein the storage management properties comprise a guaranteed performance.

22. The apparatus of claim 17, wherein the storage management properties comprise a guaranteed integrity.

23. The apparatus of claim 17, wherein the first set of storage management properties includes a first class of service and the second set of storage management properties includes a second class of service, whereby access of the first and second volumes by the first and second hosts entails differing classes of service.

24. A storage area network (SAN) that accommodates presentation of logical volumes to hosts and associates access to storage with configurable storage management properties defined by a storage domain, the storage area network comprising:

storage domains respectively defined to have associated configurable storage management properties that are separate from individual physical capabilities of physical storage resources available through the SAN, wherein a first set of storage management properties is associated with a first storage domain and a second set of storage management properties is associated with a second storage domain, with the first set of storage management properties being different from the second set of storage management properties;

logical volumes configurable for presentation to hosts through the SAN; and means for allocating the logical volumes to hosts in the context of the storage domains, wherein allocating a first logical volume to a first host in the context of the first storage domain entails the provision of storage resources according to the first set of storage management properties and allocating a second volume to a second host in the context of the second storage domain entails the provision of storage resources according to the second set of storage management properties wherein presentation of logical volumes to hosts accommodates storage resource access by hosts without requiring hosts to be configured according to the requirements of the physical storage resources, and wherein said allocation of the first logical volume to the first host entails the provision of storage resources according to the first set of storage management properties and said allocation of the second logical volume to the second host subject entails the provision of storage resources according to the second set of storage management properties even though the first logical volume and second logical volume are created from physical storage resources in common.

25. The SAN of claim 24, wherein the storage management properties comprise a guaranteed storage capacity.

26. The SAN of claim 24, wherein the storage management properties comprise a guaranteed I/O properties that include an I/O bandwidth and/or an I/O operations.

27. The SAN of claim 24, wherein the storage management properties comprise a guaranteed availability.

28. The SAN of claim 24, wherein the storage management properties comprise a guaranteed performance.

29. The SAN of claim 24, wherein the storage management properties comprise a guaranteed integrity.

30. The SAN of claim 24, wherein the first set of storage management properties includes a first class of service and the second set of storage management properties includes a second class of service, whereby access of the first and second volumes by the first and second hosts entails differing classes of service.

31. The SAN of claim 24, wherein the first and second sets of storage management properties are softly configured such that they are reconfigurable without requiring an update of the connections to the physical storage resources.

* * * * *